United States Patent [19]
Toyota et al.

[11] Patent Number: 6,007,286
[45] Date of Patent: Dec. 28, 1999

[54] DRIVING SCREW AND A METHOD FOR FORMING LUBRICATING FILM THEREON

[75] Inventors: Hiroshi Toyota; Kazunori Hayashida; Hiroaki Takebayashi, all of Osaka, Japan

[73] Assignee: Koyo Seiko Co., Ltd., Osaka, Japan

[21] Appl. No.: 08/836,388

[22] PCT Filed: Sep. 10, 1996

[86] PCT No.: PCT/JP96/02579

§ 371 Date: Jul. 18, 1997

§ 102(e) Date: Jul. 18, 1997

[87] PCT Pub. No.: WO97/12162

PCT Pub. Date: Mar. 4, 1997

[30] Foreign Application Priority Data

Sep. 11, 1995 [JP] Japan .................................. 7-232609
Sep. 9, 1996 [JP] Japan .................................. 8-237502

[51] Int. Cl.⁶ ............................. F16B 37/00; F16B 37/08
[52] U.S. Cl. ........................ 411/428; 411/432; 411/534; 411/903

[58] Field of Search .................................. 411/428, 432, 411/534, 902, 903

[56] References Cited

FOREIGN PATENT DOCUMENTS

| | | |
|---|---|---|
| 56-48750B2 | 11/1981 | Japan . |
| 63-76908A | 4/1988 | Japan . |
| 07119808A | 5/1995 | Japan . |

*Primary Examiner*—Neill Wilson
*Attorney, Agent, or Firm*—Birch, Stewart, Kolasch & Birch, LLP

[57] ABSTRACT

A feed screw including a screw shaft, a nut meshed with the screw shaft and a plurality of rolling members inserted between the screw shaft and the nut, wherein a solid film of a fluorine-containing polyurethane polymer is formed on any portions in rolling/sliding contact. The molecules of this solid film have urethane bonds, and form a three-dimensional reticular structure. Therefore, the film is unlikely to separate, peel off or wear. Accordingly, the feed screw produces less dust, improves lubricating property and thus elongates its life.

11 Claims, 6 Drawing Sheets

DRIVING SCREW AND A METHOD FOR FORMING LUBRICATING FILM THEREON

TECHNICAL FIELD

The present invention concerns a driving screw and a method for forming a lubricant film thereon. Particularly, the present invention concerns a suitable driving screw for use in an environment, where a conventional grease or oil is not available, such as in vacuum environment, clean environment, corrosion environment, and the like.

BACKGROUND ART

As the aforementioned environment, for example, a transporting system, etc., which is installed in a semiconductor manufacturing plant, may be exemplified, however, under such environment, if a grease will be used as lubricant for the driving screw, an inconvenient drawback, such as a deterioration of the lubricating property or contamination in the operational environment, may be caused according to an evaporation of an oily component from the grease.

Under such circumstances, hitherto, at least either part in moving faces of screw stem and nut, or surface of ball, is conventionally coated with a solid lubricant, such as soft metal, which includes gold, silver, lead, copper, etc., carbon, and molybdenum bisulfide in a form of film.

In the case of using the coating film made of the above mentioned solid lubricant, a dusting caused by a slight slipping of the lubricant film due to rolling and sliding motion of the ball, may be reduced to a lower level, compared with the case where grease is used, however, in which case said level is still in considerably inadequate level, particularly under the clean environment. In particular, under heavier load condition, a dusting amount is remarkably increased.

Besides these, the present invention has been carried out in coating solid lubricant, in which fluoride resin is mixed with a binder, onto at least one of sliding face between screw stem and nut, and a surface of the ball. In this case, a dusting amount may be significantly reduced compared with the above discussed conventional case.

However, even in said coating film above, dusting due to wear, other than spalling and falling of the lubricant, is remarkably increased under the relatively heavy axial load condition, resulting in shortening of the dusting life. Furthermore, if spalling and falling of the lubricating film are occurring, a lubricating function at rolling and sliding sites may be deteriorated, thereby causing trouble with respect to the operable life, such as being liable of causing adhesion due to contact between metallic parts, and accelerating abrasive wear, as well, whereas, in the environment wherein corrosive gas is present, each constitutional element, which causes spalling and falling of the lubricating film, may be attacked.

Accordingly, an object of the present invention is to provide suppressing dusting and improving in lubricating property of the driving screw, resulting in prolonging life thereof.

DISCLOSURE OF THE INVENTION

[Constitution]

The first embodiment of the driving screw according to the present invention is composed of screw stem, and nut, which are to be spirally attached, and is to provide plural movement bodies, which are related to screwing parts between the screw stem and nut, and on these elements, a solid film of fluoride containing polyurethane compound is formed in a position of at least rolling and sliding parts.

The second embodiment of the driving screw according to the present invention is composed of screw stem, and nut, which are to be screwed, and is to provide plural movable bodies, which are related to screwing parts between the screw stem and nut, and these elements are made of metallic material, on which a solid film of fluoride containing polyurethane compound is formed in a position of at least rolling and sliding parts.

The third embodiment of the driving screw according to the present invention is composed of screw stem, and nut, which is to be screwed, and is to form a solid film of fluoride containing polyurethane compound in at least any position of rolling and sliding parts.

In this connection, said solid film preferably has three dimensional network structure, and is preferably contained in dispersing state, with fluoride containing polymer, which may be in fluidized state. Further, regarding said fluidizable fluoride containing polymer, those having no functional group are preferable.

A method for forming lubricating film onto the driving screw of the first embodiment according to the present invention, comprises two processes, in which the former is the process for adhering a liquid film using a solution, which is made by diluting a fluoride containing polymer having an isocyanate group as a functional group into a solvent, and the latter is the process for forming a solid film of the fluoride containing plyurethane polymer having net work structure by curing said adhered liquid film.

A method for forming lubricating film onto the driving screw of the second embodiment according to the present invention, comprises two processes, in which the former is a process for forming liquid film onto at least one of the constitutional element of the driving screw with a solution, which is prepared by diluting a solvent with a mixture comprising the fluoride containing polymer having an isocyanate group as a functional group, and the fluoride containing polymer, which contains at least one of hydroxyl group, amino group, and carboxyl group, and the latter is a process for forming a solid film of fluoride containing plyurethane polymer compound having network structure by curing said adhered liquid film.

A method for forming lubricating film onto the driving screw of the third embodiment according to the present invention comprises two processes, in which the former is a process for forming liquid film onto at least one of the constitutional element of the driving screw with a solution, which is prepared by diluting a solvent with a single solution of a fluoride containing polymer having an isocyanate group as a functional group, or a mixture comprising the solution with a fluoride containing polymer, which contains at least one of a hydroxyl group, amino group, and carboxyl group, and the latter is a process for forming a solid film of fluoride containing plyurethane polymer compound having net work structure, in which a fluoride containing polymer contains no functional group and disperses with maintains fluidity, by curing said adhered liquid film.

As for the fluoride containing polymer, for example, perfluoro polyether having no functional group, and the like may be used.

[Function]

The fluoride containing polyurethane compound according to the present invention, discussed above, is of a solid film, in which molecules are densely packed and intimately contacted. Accordingly, when constitutional elements of the driving screw are attached to each other in sliding motion, the spalling and abrasion are scarcely caused, and sliding resistance may be alleviated, as well.

In particular, when the fluoride containing polymer is added and dispersed in a fluidized state in the solid film of fluoride containing polyurethane compound, said fluidizable fluoride containing polymer contributes as lubricant by oozing thereof out of the fluoride containing polyurethane compound.

[Effects]

In the driving screw of the present invention, spalling, falling, and abrasive wear of the lubricating material may be suppressed compared with those of the conventional coating film, and since the solid film, which is capable of alleviating a rolling and sliding resistance, is used, dusting life and lubricating property may be improved, thereby being capable of contributing improvement in production yield of semiconductor products.

BEST MODE FOR CARRYING OUT THE INVENTION

Figure 1:
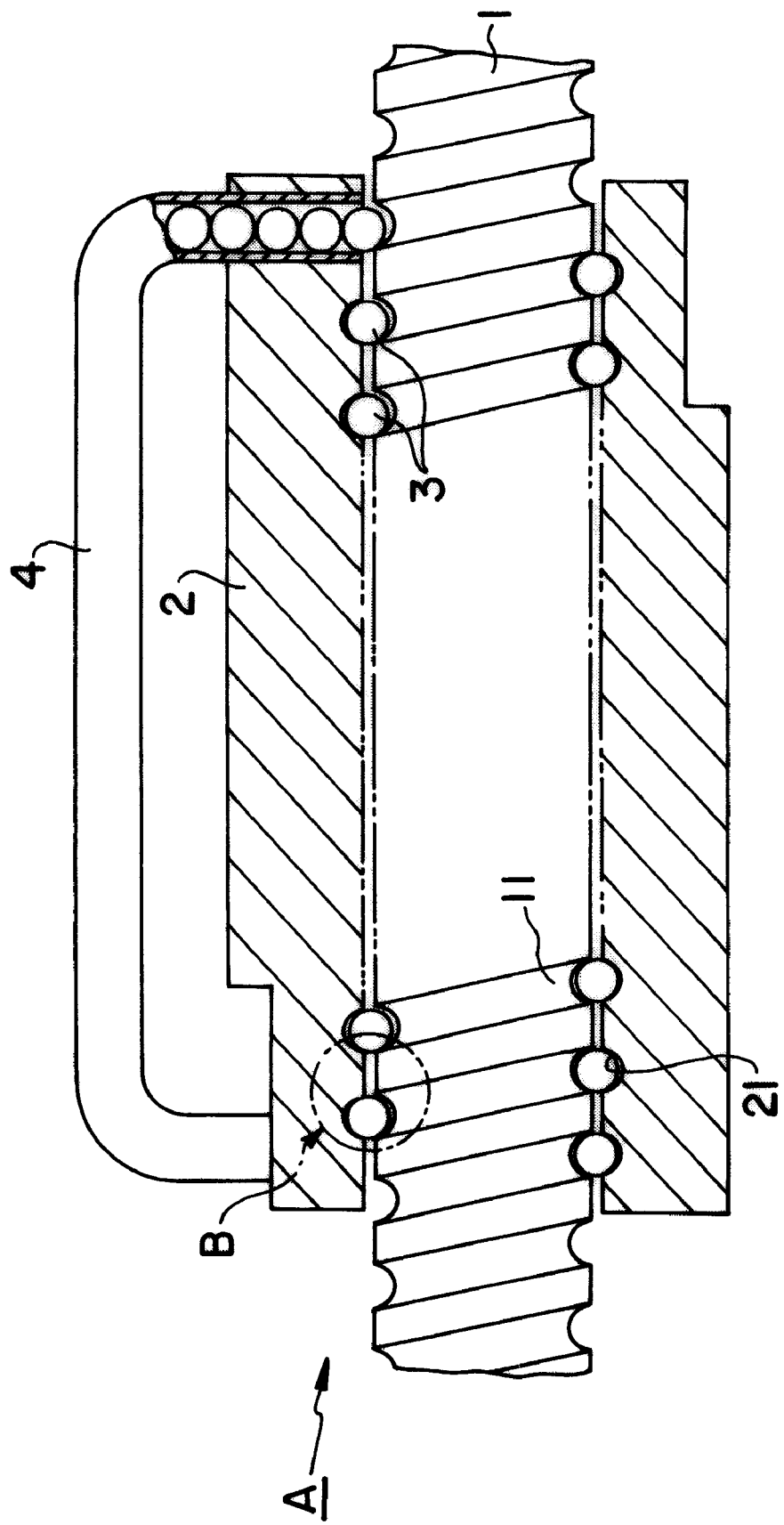
FIG. 1 schematically shows a vertical cross sectional view of the driving screw of the present invention.
Figure 2:
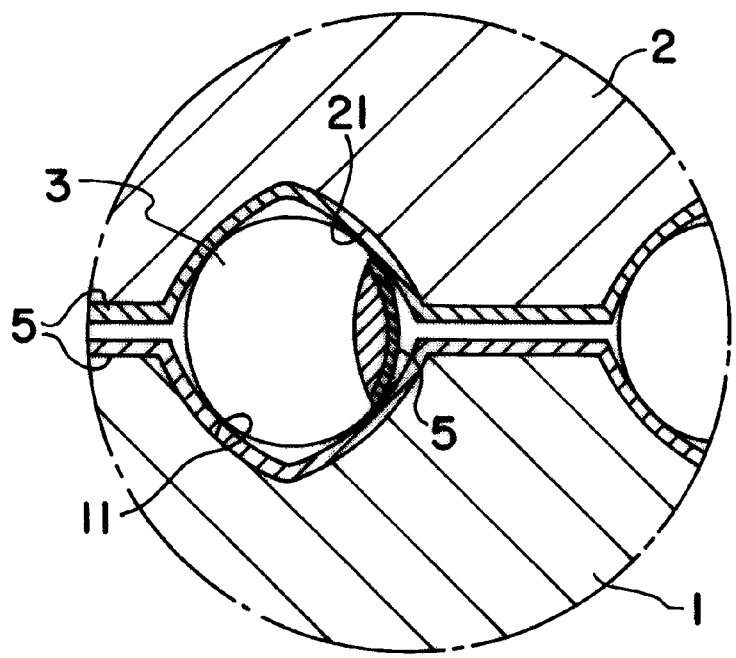
FIG. 2 shows an enlarged view of part B, shown in FIG. 1.
Figure 3:
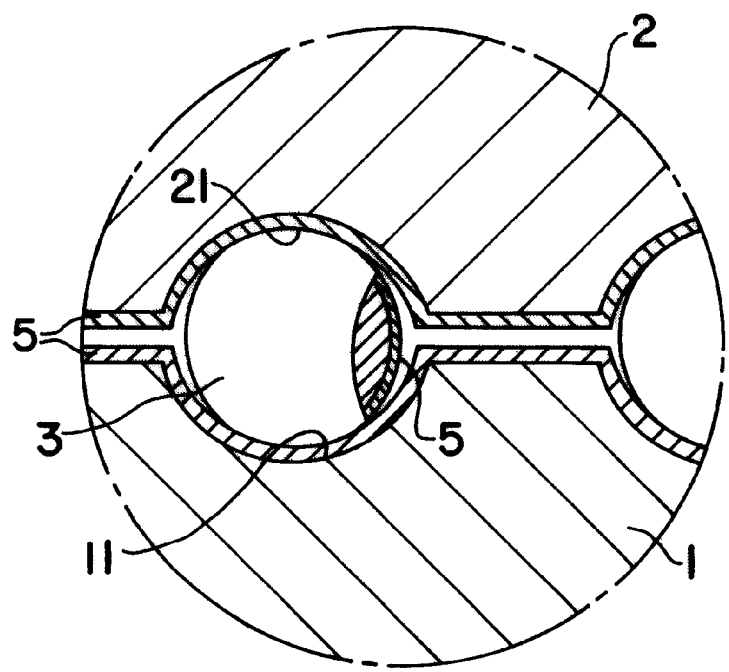
FIG. 3 shows a partial cross sectional view of an alternate embodiment of a groove for rolling ball.
Figure 4:
FIG. 4 schematically shows a structural view of a solid film of fluoride containing polyurethane polymer compound, which is formed for covering over the driving screw shown in FIG. 1.
Figure 4:
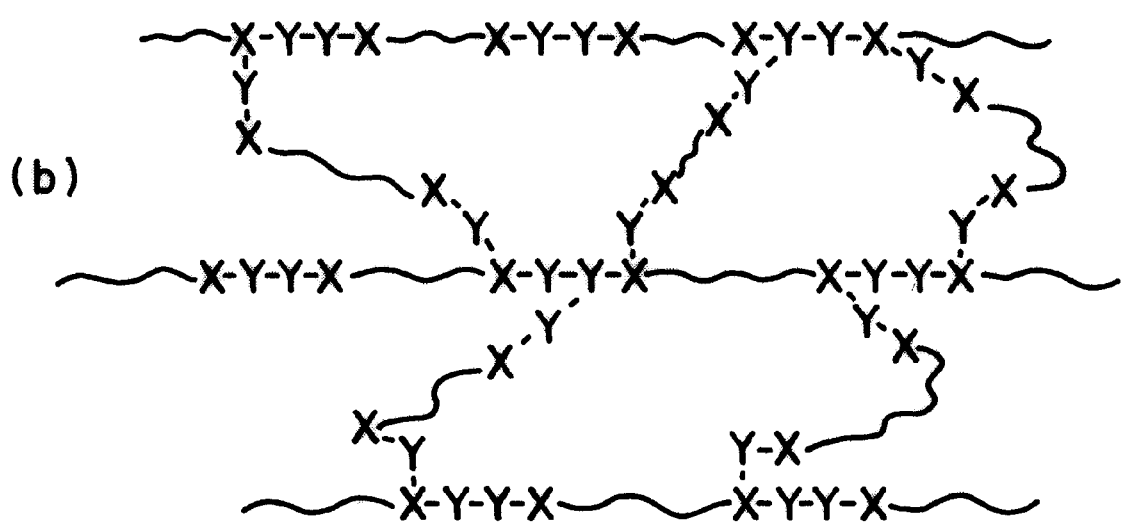
Figure 5:
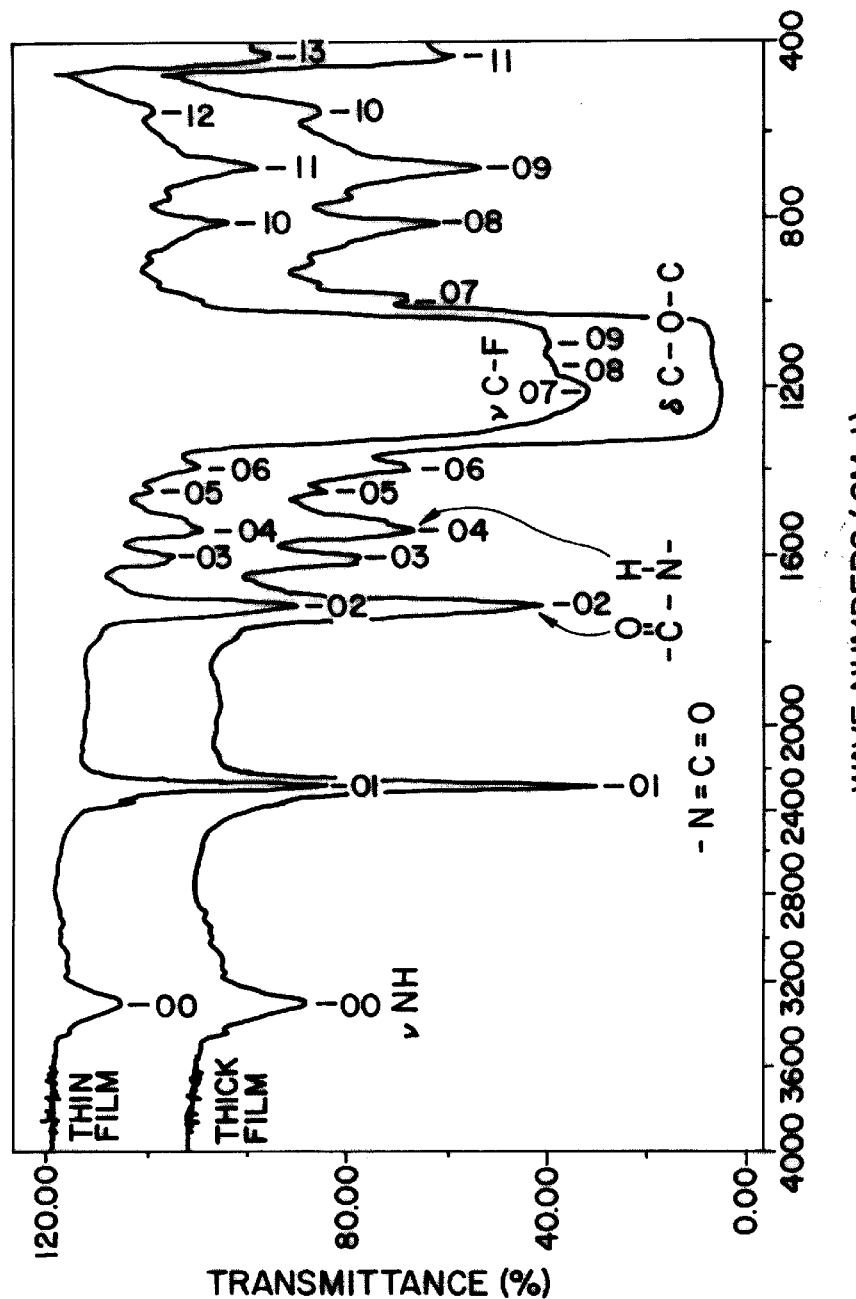
FIG. 5 is a graph showing the analytical results on the solid film property of fluoride containing polyurethane compound in a state before curing.
Figure 6:
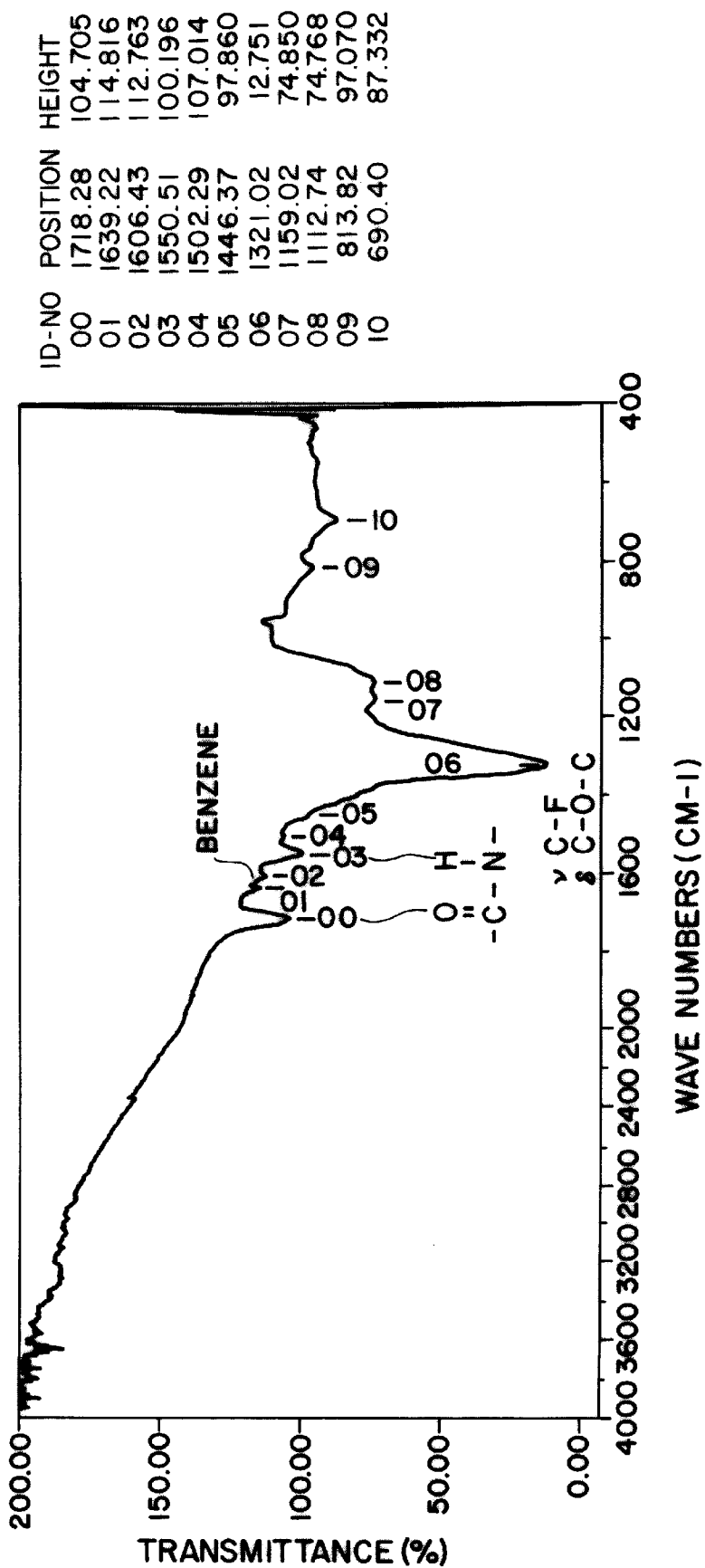
FIG. 6 is a graph showing the analytical results on the solid film property of fluoride containing polyurethane compound in a state after curing.
Figure 7:
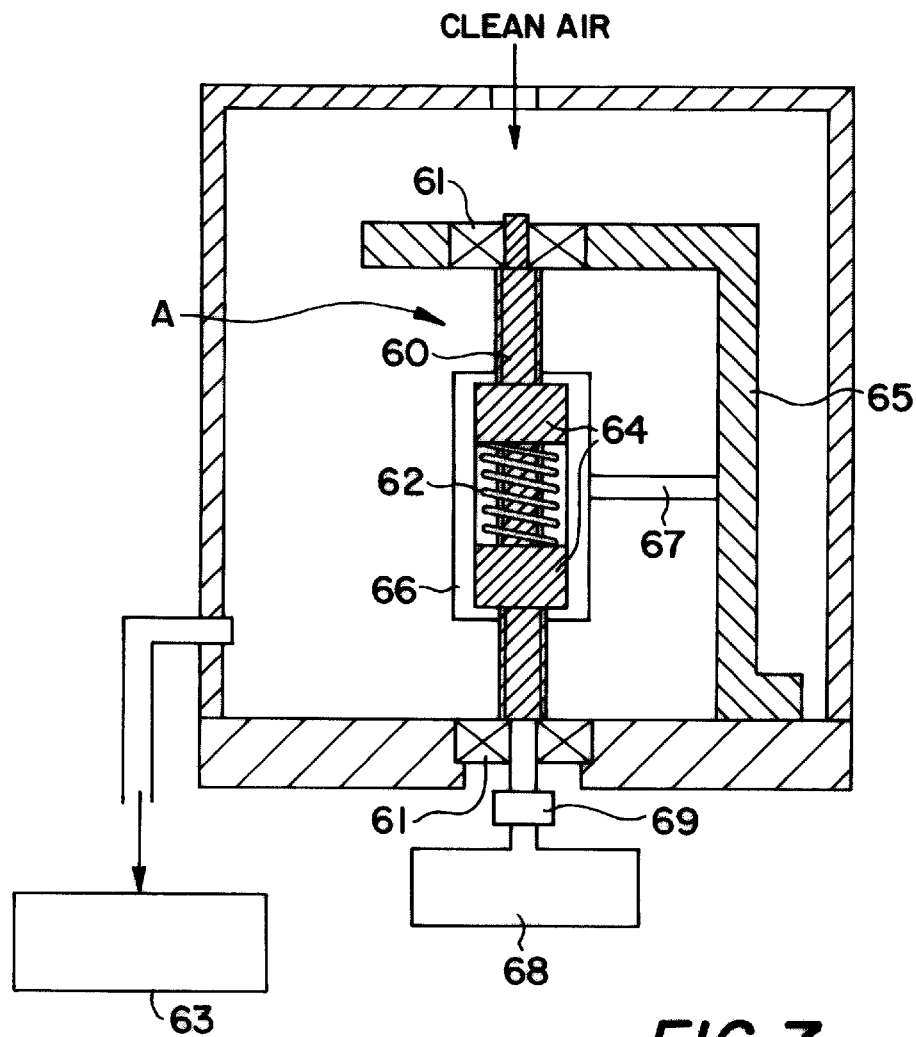
FIG. 7 schematically shows a vertical cross sectional view of a testing apparatus in construction.

In the followings, the present invention is further explained in more detailed, with referring to the examples, shown in FIGS. 1 to 8. FIGS. 1 to 7 concern one of the examples of the present invention, in which FIG. 1 is a vertical cross sectional view showing a schematic structure of the driving screw; FIG. 2 is an enlarged view of part B in FIG. 1; FIG. 3 is a partial cross sectional view showing another embodiment of ball rolling groove; FIG. 4 is a structural view, in a schematic manner, of a solid film of the fluoride containing polyurethane compound; FIG. 5 is a graph showing analytical result of fluoride containing polyurethane compound in a property before curing thereof; FIG. 6 is a graph showing analytical result of fluoride containing polyurethane compound in a property after curing thereof; and FIG. 7 is a cross sectional view, schematically showing a testing apparatus.

In these figures, A is driving screw; 1 is screw stem; 2 is nut; 3 is ball; 4 is circulator tube; and 5 is solid film of the fluoride containing polyurethane compound.

The screw stem 1 provides spiral groove 11 on the outer surface thereof. The nut 2 is fitted onto the exterior of the screw stem 1, an inner exterior surface of which forms spiral groove 21 corresponding to the spiral groove 11 of the screw stem 1. Plural number of balls 3 are interposed between the spiral groove 11 of the screw stem 1 and the spiral groove of the nut 2. The circulator tube 4 is provided for ratably circulating ball 3, which is interposed between both spiral grooves 11 and 21, due to a rotation of either screw stem 1 or nut 2, and is attached to the nut 2.

A cross sectional shape of the spiral groove 11 of the screw stem 1 and of the spiral groove 21 of the nut 2 is in a form of Gothic arch, in other words, is formed in a nearly V letter shape by combination of two circles, each of which has distinctive center of curvature. Alternately, the cross sectional shape of both spiral grooves 11, and 21, may be formed in arc, as shown in FIG. 3.

These elements, i.e., screw stem 1, nut 2, ball 3, and circulator tube 4, are made of a corrosion resistive material. In more detail, an example of the material for screw stem 1 and nut 2, includes martensite series stainless steel of SUS 440 in JIS Standard, with hardening treatment, and heat-resistant steel, such as SKH 4 in JIS Standard, and M-50 in ASTM Standard. The ball 3 may be made of ceramic material, other than the above mentioned steel. Further, the circulator tube 4 may be formed of, for example, stainless steel, such as SUS 304. An example of the afore-mentioned ceramic material preferably includes those mainly composed of silicon nitride ($Si_3N_4$) with yttoria ($Y_2O_3$), and alumina ($Al_2O_3$), and optionally aluminum nitride (AlN), titanium dioxide ($TiO_2$), or spinel ($MgAl_2O_4$) as a binding aid, alumina ($Al_2O_3$), silicon carbide (SiC), ziruconia ($ZrO_2$), or aluminum nitride (AlN).

If the driving screw A may be made of such materials, a corrosion resistance is not to be required in consideration, even when the driving screw A is used in the presence of halide series corrosive gas, which is used, for example, in semiconductor manufacturing apparatus.

Besides these, at the rolling and sliding sites in the screw stem 1, nut 2, ball 3, and circulator tube 4, a solid film 5 of fluoride containing polyurethane compound is formed. However, regardless of the fact that a solid film 5 is shown only at a spiral groove 11 of the screw stem 1, spiral groove 21 of the nut 2, ball 3, and inside surface of the circulator tube, in the figures, it should be noted that the solid film is provided also on the exterior surface thereof.

The solid film 5 of fluoride containing polyurethane compound has a principal structure unit represented by formula: —$C_xF_2$— (wherein x is an integer of 1 to 4), and has a three dimensional net work structure, each of which has an average molecular weight of several millions, and has intermolecular urethane bonding formed by curing reaction. The three dimensional structure, used herein, is a technical term in chemical field, which means not forming net work structure in cross section of the film, but forming continuous intermolecular connection to form net work and forming densely packed and homogeneous structure. An example of such a polymer may be derived in chemical formula from fluoride containing polymer having a terminal group of an isocyante functional group, as shown in the following chemical formulae. An example of the fluoride containing polymer having an isocyanate functional group at the terminal end, which may be adequately used, includes a derivative of perfluoro polyether (PFPE), and concretely, for example, Fonbrin Z Disoc (trade name of Monte Catini, Company).

[ka 1]

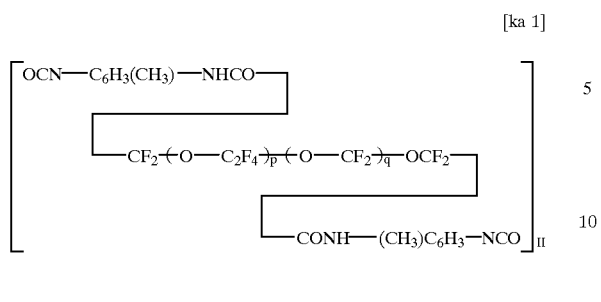

Next, one embodiment of a method for forming the solid film of the fluoride containing polyurethane polymer, mentioned above, is explained.

(a) A solution for obtaining a solid film 5 of fluoride containing plyurethane polymer compound was prepared. Screw stem 1, nut 2, ball 3, and circulator tube 4 were submerged into said solution, individually, or alternately, a driving screw A, which was assembled in complete form, was immersed in a lubricating oil, and the screw stem was revolved several times so as to attach liquid film onto a whole surface of the screw stem 1, nut 2, ball 3 and circulator tube 4 (attaching treatment). The solution, prepared in this stage, was of a fluoride containing polymer having an isocyanate functional group at the terminal end (Fonblin Z Disco, derivatives), which was diluted with a diluting solvent (fluoride type solvent, Sv 90 D) to 1 mass % concentration of fluoride polymer.

(b) The driving screw A, as a whole, on which said liquid film was attached, was heated to 40 to 50° C., for 1 minute, to remove the solvent from the liquid film (drying treatment). At this stage, the liquid film was maintained, as it was, in fluid state.

(c) Thereafter, the driving screw A was heated to, for example, 100 to 200° C., for 20 hours (curing treatment). By way of said treatment, the solid film of the fluoride containing polyurethane compound was obtained by curing reaction due to a change in chemical formula of the liquid film. In this connection, during the curing treatment, each of the fluoride containing polymer having functional groups in the liquid film was carried out in 4 types of curing reactions, shown as in the following chemical schemes 2 to 5, resulting in the disappearance of the terminal isocyanate group (NCO), and forming urethane bonds by connecting fluoride polymers having functional groups, into three dimensional network. The urethane bonding was linearly cross linked, as schematically shown in FIG. 4(*a*), by the curing reaction, shown in FIGS. 2 and 3, and formed cross links in a three dimensional direction, as schematically shown in FIG. 4(*b*), by the curing reaction shown in FIGS. 4 and 5.

Furthermore, in FIG. 4,

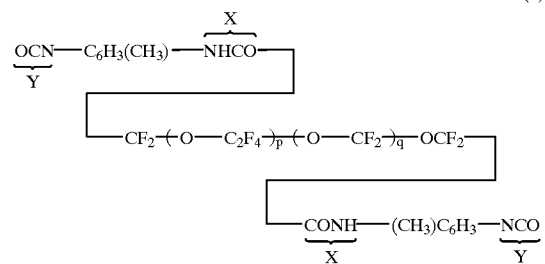

It is schematically shown as

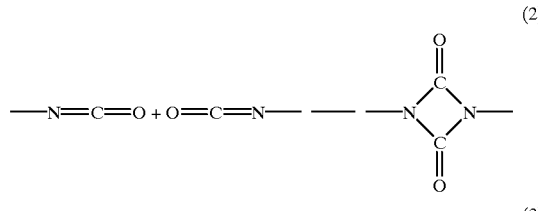

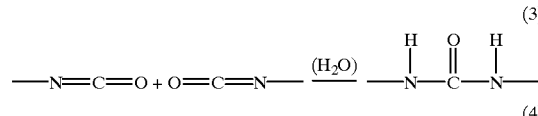

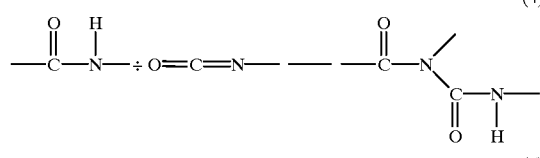

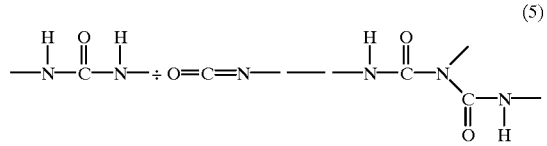

According to such treatments as discussed above, in the structural elements of the driving screw A, the solid film 5 of the fluoride containing polyurethane compound may be formed with suitable thickness in at least the respective contacting sites thereof. Further, the treatments (a) and (b) may be repeatedly carried out several times, on demand, so that a thickness of the fluoride containing polyurethane compound may be optionally defined, for example, within 0.1 to 3 $\mu$m, as a final thickness.

Hereinbelow, since a property of the film was analyzed, which was formed into films by following two methods, wherein, in the former, the solution prepared in the treatment step (a) was simply concentrated and dried (while still maintaining fluidity), and in the latter, the same solution was cured by coating on a specimen, such as stainless steel plate, the properties of the film are discussed.

In the former case, the property is analyzed by FT-IR method (Fourier transform infrared spectroscopy, liquid film method). From the results, shown in a graph of FIG. 5, it is confirmed that other than a peak for fluorine series, peaks of NH (3300 $cm^{-1}$), N=C=O (2279 $cm^{-1}$), N(H)C=O (1712 $cm^{-1}$, 1546 $cm^{-1}$), and benzene (1600 $cm^{-1}$) were found. Accordingly, a benzene ring, urethane bonding, and isocyanate exist as functional groups. In this analysis, a study is made both on thin and thick films, and analysis was made regardless of the film thickness. In the latter case, the result was analyzed by FT-IR method (Fourier transform infrared spectroscopy, high sensitivity reflection method). From the results, shown in a graph of FIG. 6, it is confirmed that peaks of benzene ring and urethane were found, but no isocyanate peak was found. That is, according to the results above, a chemical structural change was confirmed, as shown in FIGS. 2 to 5, above.

As discussed above, since the solid film 5 of the fluoride containing polyurethane polymer compound has a three dimensional structure, the film elaborately covers over the object material, and possesses self-lubrication property. Dusting due to abrasion and spelling, caused by rolling and sliding movements in the structural element of the driving screw A, may be suppressed, resulting in overcoming direct contact of the structural elements in the driving screw A, with each other.

As for another alternate embodiment of the present invention, the solid film 5 of fluoride containing polyurethane compound, discussed in the above embodiment, may be formed in a structure such that a fluoride containing polymer, such as fluoro polyether is added and dispersed in the three dimensional structure, in which urethane bonding is formed in the inner molecule. In this case, concretely, the solution prepared in attaching treatment (a) under a forming method of the embodiment, may be used as a mixture of a fluoride containing polymer having an isocyanate terminal group (for example, Fonblin Z Disoc, derivatives, trade name), and a fluoride containing polymer having no functional group, such as a fluoride containing compound (for example, Fonblin Z-60, derivatives, trade name) in a specific ratio. Under the circumstances, since the fluoride containing polymer having no functional group will not connect to the fluoride containing polymer having a functional group, in the curing treatment (c), the fluoride containing polymer having no functional group shows fluidity in the solid film 5 of fluoride containing polyurethane compound, resulting in exhibiting lubrication by oozing out of the solid film 5 of the fluoride containing polyurethane compound. Further, the fluoride containing polymer is not restricted to those having a functional group, as stated above, and the fluoride containing polymer shown in FIGS. 6, 7, and 8, may be used.

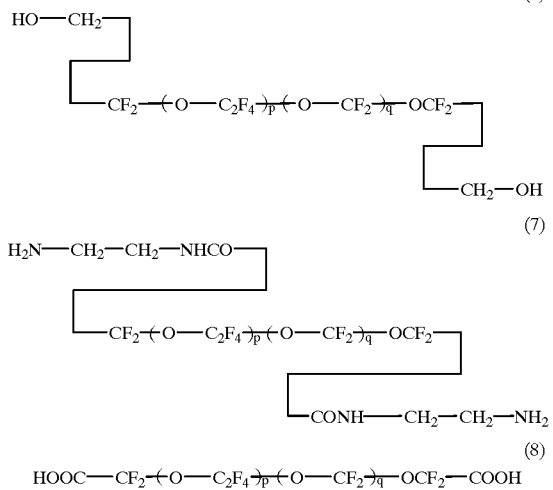

Since a dusting life and torque life of the solid film 5 of fluoride containing polyurethane compound, were evaluated, these are explained as follows. The evaluations are discussed on a total of five examples, i.e., Examples 1 to 4, and Comparative Example.

In Examples 1 to 4, the solid film 5 of the fluoride containing polyurethane compound was formed over the whole surfaces of screw stem, nut, ball, and circulator tube, and the thickness thereof was defined as in 1 $\mu$m.

The solid film of the fluoride containing polyurethane compound used in Example 1, was obtained by exclusively using a fluoride containing polymer having an isosyanate functional group (Fonblin Z Disoc, derivative).

The solid film of the fluoride containing polymer used in Example 2 was obtained by adding a fluoride containing polymer having hydroxyl (—OH) functional group at the terminal end(Fonblin Z Dol, derivative) to a fluoride containing polymer having an isocyanate functional group at the terminal end (Foblin Z Disoc, derivative).

The solid film of the fluoride containing polymer used in Example 3 was obtained by adding a fluoride containing polymer having no functional group (Fonblin Z-60, derivative) to a fluoride containing polymer having isocyanate functional group at the terminal end (Foblin Z Disoc, derivative).

The solid film of the fluoride containing polymer used in Example 4 was obtained by adding a fluoride containing polymer having hydroxyl group (Fonblin Z Dol, derivative), and fluoride containing polymer having no functional group (Fonblin Z-60, derivative) to fluoride containing polymer having isocyanate functional group at the terminal end (Foblin Z Disoc, derivative).

In the Comparative Example, the whole surface of the screw stem, nut, ball, and circulator was covered with a coating film. Said coating film was made by dispersing and mixing polytetrafluoroethylene in a binder of a thermocurable resin (polyimide) and was formed into film having thickness of 1 $\mu$m. In said coating film, a relatively hard and dense thermocurable resin forms a "sea", and heterogeneous polytetrafluoroethylene forms scattered "islands", and both parts are connected with weak bonds.

The evaluation test was conducted using an apparatus shown in FIG. 7. In FIG. 7, 60 is screw shaft of the driving screw A; 61 is a support bearing for driving screw A; 62 is a spring against load; 63 is particle counter; 64 is a nut for driving screw A; 65 is a support plate; 66 is a housing for nut 64; 67 is a stopper for rotating of the housing; 68 is a motor; and 69 is a coupling between motor 68 and screw shaft 60.

Testing conditions are as follows:
Revolving speed: 120 r.p.m.
Load: Axial load (25 N, 50 N, 75 N)
Stroke: 50 mm
Atmosphere: Open air in a clean bench (Class 10), Vacuum (2.6×10$^{-4}$ Pa or lower)
Environment temperature: Room temperature
Measurement condition: Dusting number of grains having grain size of 0.1 $\mu$m, or larger The driving screw A, used in the test has nominal identification numbers of 1404, 7TS3, and 5C7, which have 14 mm shaft diameter in screw shaft 1, ball 3 having a diameter of 2 mm (3.5 rolls, 1 row), and lead having 3/16 inches (4.763 mm).

In the dusting life test, the atmosphere, environment temperature, and axial load were set to open air, room temperature, and 75 N, respectively. In a dusting life test a time was measured, repeatedly 10 cycles, in which a total dusting amount reached to 0.1 cf/1000 ea. Each measurement was carried out with 10 minute intervals.

In each of the Examples, a concentration of the Foblin derivatives was varied as follows; 1 mass % of the Foblin Z Disoc, derivative in Example 1; 1 mass % of Foblin Z Disoc, derivative, as a base, and 0.25 mass % of Foblin Z Dol, derivative, added, in Example 2; 1 mass % of Foblin Z Disoc, derivative, as a base, and 0.25 mass % of Foblin Z-60, derivative, added, in Example 3; and 1 mass % of Foblin Z Disoc, derivative, as a base, and 0.25 mass % of total Foblin Z Dol, and Foblin Z-60, derivatives, added, in Example 4.

As the results, the life in each Example was obtained as, 200 hours in Comparative Example, 300 hours in Example 1, 1400 hours in Example 3, and 1350 hours in Example 4. A time of dusting life in from long to short may be shown in an order of Example 3, Example 4, Example 2, Example 1, and Comparative Example. That is to say, even the solid film of fluoride containing urethane polymer compound, obtained by only using Foblin Z Disoc, derivative, as in Example 1, is superior in the dusting life to those of Comparative Example. However, the solid film 5, obtained by adding Foblin Z derivative, having a functional group at side chain, or Foblin Z derivative having no functional group at side chain, to the Foblin Z Disoc, derivative as a base, which was used in Examples 2 to 4, was further more superior to those of the Example 1.

That is to say, since the solid film 5 of the fluoride containing polyurethane compound, used in Examples 1 to 4, forms three dimensional network structure, and a dense homogeneous film, when rolling and sliding movements were caused between each constitutional element of the driving screw A, a spalling and abrasion wear may be hardly caused.

For instance, in Examples 3 and 4, when the axial load was 50 N, the dusting life becomes 5600, and 5500 hours, respectively, whereas when the axial load is 20 N, the dusting life was to be improved to 14000, and 139000 hours, respectively. In the case of Examples 2 and 1, the dusting life was also improved in the same ratio as in the case of the Examples 3 and 4, above. On the other hand, in the Comparative Example, when the axial load is 50 N, the dusting life is prolonged to as long as 260 hours, which is of fairly lower level of improvement, compared with those in Examples 3 and 4. Accordingly, the material of the solid film may be preferably selected, depending on an object element, from any solid film, used in Examples 1 to 4.

From the results discussed above, it is understood that as regarding the solid film of the fluoride containing polyurethane compound, those made of the fluoride containing polymer, prepared by adding fluoride containing polymer having fluidity is more preferable than those made by exclusively using the fluoride containing polymer having an isocyanate functional group at the terminal end. As for the fluoride containing polymer to be added, it is also understood that the fluoride containing polymer having no functional group is the most preferable.

Under the circumstances, an addition amount of the lubricants is considered below. The dusting life under 100 N of the axial load, was tested using 1 mass % of Fonblin Z Disoc, derivative, as a base polymer, with adding Foblin Z-60, derivative, in a concentration of 0.25 mass %, and 0.5 mass % respectively. The result shows 1400 hours and 990 hours, in a case of concentrations in 0.25 mass % and 0.5 mass %, respectively, and the result in a case of concentration in 0.25 mass % is considered to be adequate. However, as regarding the addition amount, with leaving the margins of upper and lower limits in a certain extent, a concentration of the Foblin Z-60 derivative, which is to be added to 1 mass % of Foblin Z Disoc derivative, as a base, may be within a range of 0.1 to 0.75 mass %. Further, a concentration of the Foblin Z Disoc derivative, as a base, may be within a range of 1 to 10 mass %. In this case, when the concentration of the Fonblin Z Disoc derivative, as a base, takes, for example, 5 mass %, which is the upper limit thereof, a concentration of the Foblin Z-60 derivative, added, may also be within a range of 0.5 to 2.5 mass %, so that both concentrations are established in always constant level. However, when the concentration of the base becomes thicker, the dusting life tends to be lowered.

Furthermore, the present invention is not limited to the examples above, and several application and variation may be considered.

(1) At one or both ends of the axis direction of nut 2, a non-contacting type seal, which is proximity to a spiral groove 11 of the screw stem 1 may be provided, on demand, and may contribute in more lowering dusting property. Said seal may be formed into a cylindrical shape of an elastic material, such as synthetic rubber, and may have convex part, having a cross section which in proximity to a spiral groove 11 of the screw stem 1, within a required angle range on an interior surface.

Figure 8:
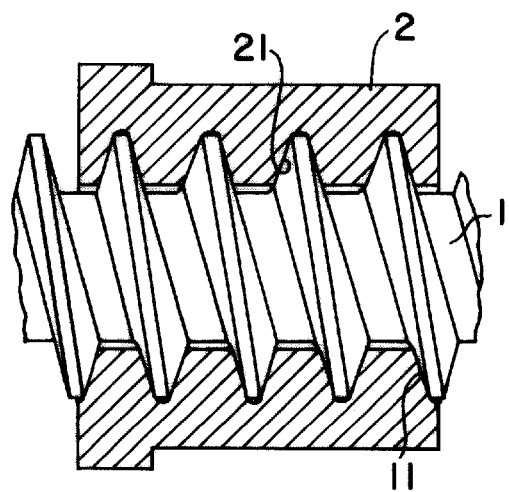
FIG. 8 shows a vertical cross sectional view of the driving screw of another embodiment according to the present invention.

(2) In the above Examples, a driving screw of type for providing ball is referred to, however, a driving screw providing no ball, as shown in FIG. 8, may be available according to the present invention. In this case, the solid film 5 may be enough for forming in at least either one of the spiral groove 11 of the screw stem , and spiral groove 21 of the nut 2.

(3) In the above Examples, a curing treatment (c) may utilize an energy of electromagnetic ray (light), such as ultraviolet ray, infrared ray, γ ray, and electron beam, in place of heating.

(4) In the above Examples, a drying treatment (b) may be omitted.

(5) Although over all of the constitutional elements of the driving screw A in the above Examples, solid film 5 of the fluoride containing urethane polymer compound is formed, the solid film may be formed only over the screw stem 1 and nut 2, or only over ball 3, in the driving screw A, (6) In the above Examples, although the solid film 5 of the fluoride containing polyurethane compound is also formed over the outer face of the coating object, the solid film may be formed exclusively over the spiral grooves 11, and 21, for the driving screw A, or over the inner surface for the circular tube. In this treatment, a part, where a coating is not required, is covered with masking, and each element, thus covered, is immersed into a solution, prepared in the treatment (a), in advance of assembling thereof into the driving screw A, is cured each optionally. However, if the solid film 5 is also formed over the outer surface, a corrosion resistant effect is enhanced in the utilization under corrosive environment, thereby saving additional corrosion resistant treatment.

Scope of claims

We claim:

1. A driving screw, providing a screw stem, nut, which is spirally engaged therewith, and plural number of rolling elements, which are interposed in a spiral part between the screw stem and the nut, wherein a solid film of fluoride containing polyurethane compound is formed on at least one of the rolling and sliding parts.

2. A driving screw, providing a screw stem, nut, which is spirally engaged therewith, and plural number of rolling elements, which are interposed in a spiral part between the screw stem and the nut, wherein at least one of said driving screw, screw stem, nut and rolling elements is formed of metallic material, and a solid film of fluoride containing polyurethane compound is formed on at least one of the rolling and sliding parts.

3. A driving screw, providing a screw stem, and nut, which are spirally engaged with each other, wherein a solid film of fluoride containing polyurethane compound is formed on at least one sliding part.

4. The driving screw according to any of claims 1 to 3, wherein said solid film has a three dimensional structure.

5. The driving screw according to claim 4, wherein a fluidizable fluoride containing polymer, is dispersed and added in said solid film.

6. The driving screw according to claim 5, wherein said fluidizable fluoride containing polymer has no functional group.

7. The driving screw according to any of claims 1 to 3, wherein a fluidizable fluoride containing polymer, is dispersed and added in said solid film.

8. The driving screw according to claim 5, wherein said fluidizable fluoride containing polymer has no functional group.

9. A method for forming a lubricant film on the driving screw of claim 1, which comprises:

attaching a liquid film on at least one of the driving screw, a screw stem, nut and rolling element by using a solution, in which a fluoride containing polymer having an isocyanate group as a functional group, is dissolved with a solvent, and curing the attached liquid film to form a solid film of the fluoride containing polyurethane compound on at least one of the rolling and sliding parts.

10. A method for forming a lubricant film on the driving screw of claim 1, which comprises:

attaching a liquid film on at least one of the driving screw, a screw stem, nut and rolling element, using a mixture of a fluoride containing polymer having an isocyanate group as a functional group, and a fluoride containing polymer containing at least one of hydroxyl group, amino group, and carboxyl group, which is dissolved with a solvent, and curing the attached liquid film to form a solid film of the fluoride containing polyurethane compound on at least one of the rolling and sliding parts.

11. A method for forming a lubricant film on the driving screw of claim 1, which comprises attaching a liquid film on at least one of the driving screw, a screw stem, nut and rolling element using a solution comprising a fluoride containing polymer having an isocyanate group as a functional group, alone, or a solution, which is obtained by adding a fluoride containing polymer having no functional groups to a mixture of the fluoride containing polymer having isocyanate group with a fluoride containing polymer containing at least one of hydroxyl group, amino group, and carboxyl group, which is dissolved with a solvent, and partially curing the attached liquid film to form a solid film of the fluoride containing polyurethane compound on at least one of the rolling and sliding parts, with maintaining fluidity of the fluoride containing polymer having no functional group.

* * * * *